United States Patent
Masaki

(10) Patent No.: US 6,620,499 B2
(45) Date of Patent: Sep. 16, 2003

(54) MAGNETIC RECORDING MEDIUM

(75) Inventor: Kouichi Masaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/083,155

(22) Filed: Feb. 27, 2002

(65) Prior Publication Data

US 2002/0164504 A1 Nov. 7, 2002

(30) Foreign Application Priority Data

Feb. 28, 2001 (JP) ........................................ 2001-054593

(51) Int. Cl.$^7$ ............................................... G11B 5/706
(52) U.S. Cl. ................................ 428/329; 428/694 BH; 428/694 BS
(58) Field of Search ........................... 428/329, 694 BH, 428/694 BS

(56) References Cited

U.S. PATENT DOCUMENTS

| | | | | |
|---|---|---|---|---|
| 4,569,775 A | * | 2/1986 | Kubo et al. | 252/62.59 |
| 4,939,045 A | * | 7/1990 | Yoshida et al. | 428/664 |
| 5,601,916 A | * | 2/1997 | Yamazaki et al. | 428/329 |
| 5,693,397 A | * | 12/1997 | Saito et al. | 428/65.3 |
| 5,714,275 A | * | 2/1998 | Yamazaki et al. | 428/694 B |
| 5,770,302 A | * | 6/1998 | Masaki et al. | 428/323 |
| 6,099,957 A | * | 8/2000 | Yamamoto et al. | 428/323 |

OTHER PUBLICATIONS

T. Suzuki et al., Recording Capability and Thermal Stability for Particulate Media with Inter–Practice Interaction, IEICE Trans. Electron., vol. E84–C, No. 9 (2001), pp. 1147–1153.

* cited by examiner

Primary Examiner—Stevan A. Resan
(74) Attorney, Agent, or Firm—Sughrue Mion, PLLC

(57) ABSTRACT

A magnetic recording medium having on a support a non-magnetic layer comprising a non-magnetic powder dispersed in a binder resin and on the non-magnetic layer a magnetic layer comprising a ferromagnetic powder dispersed in a binder resin, wherein the ferromagnetic powder is a Hexagonal (system) ferrite magnetic powder having an average tabular diameter of 10 to 35 nm and a coercive force (Hc) of 135 to 400 kA/m, and besides, the magnetic layer has a coercive force (Hc) of 135 to 440 kA/m, an anisotropic magnetic field of at least 358 kA/m and a rotational hysteresis loss integral of 0.5 to 0.95. Even when the magnetic recording medium is used in combination with an MR head, it can ensure high short-wavelength output, high C/N ratio and excellent recorded-magnetization stability.

3 Claims, No Drawings

MAGNETIC RECORDING MEDIUM

FIELD OF THE INVENTION

The present invention relates to a magnetic recording medium, such as a magnetic tape, and more specifically to a magnetic recording particulate medium (i.e., a coating-type magnetic recording medium) which has a magnetic layer formed by coating on a support a magnetic coating composition containing as main components a ferromagnetic powder and a binder. In particular, the present invention relates to a magnetic recording medium containing a specific hexagonal (system) ferrite in a magnetic layer and enabling high-density recording, which is especially suitable for systems using a magnetoresistance-utilized MR head (i.e., magneto resistive head) for reproduction.

BACKGROUND OF THE INVENTION

Magnetic recording media hitherto used widely as video tapes, audio tapes, tapes for computer use or flexible disks have magnetic recording layers containing ferromagnetic iron oxide, cobalt-modified ferromagnetic iron oxide, $CrO_2$, ferromagnetic metal powder or hexagonal (system) ferrite in a state of being dispersed in binder. Therein, the magnetic recording layer is provided on a support by the use of coating techniques. Of those ferromagnetic powders, Hexagonal (system) ferrite is known to have excellent high-density recording characteristics (by, e.g., JP-A-60-157719, JP-A-62-109226 and JP-A-3-280215, wherein the term "JP-A" means an "unexamined published Japanese patent application).

In JP-A-5-12650 is disclosed a magnetic recording medium provided with a Hexagonal (system) ferrite-containing magnetic layer, wherein the magnetic layer has a thickness adjusted to the range of 0.1 μm to 0.6 μm and a non-magnetic layer having a thickness greater than the thickness of the magnetic layer is formed between the magnetic layer and a support, thereby achieving improvements in surface properties, short wavelength output, erasure characteristics and durability. On the other hand, JP-A-5-225547 discloses a magnetic recording medium having on a support a non-magnetic layer and on the non-magnetic layer a magnetic layer containing magnetic powders having a particle size of 0.1 μm or below, thereby attaining not only excellent high-wavelength region characteristics but also a satisfactory signals-overwriting property and sufficient durability.

Further, JP-A-3-286420 and *IEEE. Trans. Mag.*, vol. 24 (6), p. 2850 (Nov. 1988) disclose that the anisotropic magnetic field Hk of hexagonal (system) ferrite has an influence upon electromagnetic (conversion) characteristics of a magnetic recording medium. The magnetic recording medium disclosed in the former publication has two magnetic layers on a non-magnetic layer. The lower magnetic layer thereof has its axis of easy magnetization in a long length direction, and in the upper magnetic layer is incorporated a magnetic powder having an anisotropic magnetic field (Hk) of not more than 239 kA/m. And such a medium can provide high output over a wide range from long to short wavelengths. Furthermore, JP-A-8-115518 proposes a high-density recording medium having an Hc value of 103.5 to 398 kA/m, an Hc/Hk ratio of 0.30 to 1.0 and a squareness ratio SQ of 0.65 to 1.00 in the in-plane direction. This medium is characterized by having a Hexagonal (system) ferrite magnetic powder-containing magnetic layer whose Hc value, Hc/Hk ratio and squareness ratio SQ in the in-plane direction are within individually specified ranges. By specifying such factors, a marked improvement in very short wavelength output necessary for high-density recording is attained. Even by application of such methods to magnetic recording media, however, there still remains a problem that the recording media obtained cause high noise when they are used in combination with an MR head.

In recent years, magnetoresistance-utilized high-sensitivity reproduction heads (MR heads) have come to be used in data recording systems for computers. Therein, the magnetic recording medium-originated noise occupies a dominant position in system noise. Okabe et al. suggests that the combined use of a barium ferrite-containing magnetic medium and a MR head is advantageous since it can inhibit saturation of the MR head (in IEEE. Trans. Mg., volume 32 (5), pages 3404–3406 (1996)).

In order to reduce the media noise originated from magnetic recording media, it has been underway to make ferromagnetic particles finer. However, it is thought that an influence of thermal fluctuation on ferromagnetic particles is increased as the particles are made finer, and thereby stability of magnetization transition domain is lowered. Therefore, a solution to this problem is sought. The stability of magnetization is evaluated by KuV/kT (wherein Ku represents a magnetic anisotropic constant, V represents a particle volume, k represents Boltzmann constant and T represents an absolute temperature). In regard to the particle volume and thermal fluctuation of metallic tapes, there is a report presented by Toshiyuki Suzuki et al. (Shingaku Giho MR97-55, pages 33–40 (Nov. 21, 1996).

In the case of Hexagonal (system) ferrite, it is difficult to get a great Ku value because the saturation magnetization thereof is about ⅓ to about ½ of the saturation magnetization of a ferromagnetic metal powder; as a result, the thermal fluctuation tends to become great. Further, there is an indication that the inter-particle interaction in a magnetic recording medium using Hexagonal (system) ferrite is great and has an influence on a noise level of the medium. It can be said that the great inter-particle interaction secures high magnetization stability, but if magnetization of particles is once inverted through some cause, the possibility that a magnetic substance around the particles causes inversion of its magnetization under the influence of the particles is also increased. Probably, such magnetization inversion causes a problem that it is difficult to secure sufficient C/N in reproducing a prerecorded high-density recording medium using a fine powder of magnetic hexagonal (system) ferrite by means of an MR head.

SUMMARY OF THE INVENTION

The present invention has made in view of those problems concerning the related arts. And the object of the present invention is to provide a magnetic recording medium using an extremely fine powder of Hexagonal (system) ferrite and enabling achievement of high short-wavelength output and high C/N even when an MR head is used for reproduction in combination therewith, and besides, capable of ensuring high stability for magnetization recorded therein.

As a result of our intensive study of the problems wherein our attention has been focused on anisotropic magnetic field and rotational hysteresis loss integral (RH) in particular, it has been found that ultrashort-wavelength output necessary for high-density recording and magnetization stability can be greatly improved by using a special magnetic powder in a magnetic layer and adjusting a coercive force Hc, an anisotropic magnetic field Hk and a rotational hysteresis loss integral of the magnetic layer to respectively specified numerical ranges, thereby achieving the present invention.

More specifically, the present invention is embodied by a magnetic recording medium having on a support a non-magnetic layer comprising a non-magnetic powder dispersed in a binder resin and on the non-magnetic layer a magnetic layer comprising a ferromagnetic powder dispersed in a binder resin, wherein the ferromagnetic powder is a hexagonal (system) ferrite magnetic powder having an average tabular diameter of 10 to 35 nm and a coercive force Hc of 135 to 400 kA/m, and that the magnetic layer has a coercive force Hc of 135 to 440 kA/m, an anisotropic magnetic field of at least 358 kA/m and a rotational hysteresis loss integral of 0.5 to 0.95.

In addition to the constitutional requirements described above, the magnetic recording medium of the present invention can remarkably achieve its effects when the magnetic layer has a squareness ratio SQ of 0.50 to 0.65 in the in-plane direction, and the effects thereof can also be increased when the magnetic layer has a thickness of 0.01 to 0.5 $\mu$m and the product of a residual magnetic flux density and a magnetic layer thickness is within the range of 0.5 mT·$\mu$m to 100 mT·$\mu$m.

DETAILED DESCRIPTION OF THE INVENTION

The present invention is described below in detail.

The anisotropic magnetic field Hk and the rotational hysteresis loss integral specified in the present invention can be determined in the following manners respectively.

Values of rotational hysteresis loss Wr are measured while increasing the strength of a magnetic field applied to a magnetic layer from a low magnetic field of the order of 0 to 20 kA/m to a high magnetic field of 800 kA/m, and the Wr values measured are plotted against the reciprocal of an applied magnetic field (1/H). The Wr curve data on the high magnetic field side is approximated by a quadratic curve, and the magnetic field corresponding to Wr=0 is sought. The thus sought magnetic field is taken as the anisotropic magnetic field Hk. On the other hand, the rotational hysteresis loss integral is determined by integrating Wr/Is (wherein Is represents magnetization of a sample, and Wr is divided by Is for normalization) with respect to 1/H.

The magnetic layer (upper layer) of the magnetic recording medium of the present invention contains a magnetic powder and a binding resin as main components, and one feature of the present invention is in that the magnetic powder is a hexagonal (system) ferrite magnetic powder having an average tabular diameter of 10 to 35 nm and a coercive force Hc of 135 to 400 kA/m.

Examples of a Hexagonal (system) ferrite magnetic powder usable in the present invention include barium ferrite, strontium ferrite, lead ferrite and calcium ferrite and substitutes of their ferrites. Specifically, magnetoplumbite-type barium or strontium ferrite, and further magnetoplumbite-type barium or strontium ferrite containing in part a spinel phase are usable in the present invention. These magnetic ferrite powders may contain various atoms other than the specified atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. Examples of elements which can be generally used in combination include Co—Ti, Co—Ti—Zr, Co—Nb, Co—Ti—Zn, Co—Zn—Nb, Ni—Ti—Zn, Nb—Zn, Ni—Ti, Zn—Ti and Zn—Ni. However, pure magnetoplumbite type ferrite is preferable as compared with composite ferrite rich in spinel phase because the pure ferrite can ensure a narrow coercive force distribution (i.e., a narrow Switching Field Distribution: SFD).

Coercive force control can be effected using various methods. For instance, a method of controlling a composition, a particle size and a particle thickness of ferrite, a method of controlling a spinel phase thickness in Hexagonal (system) ferrite, a method of controlling a content of elements to be substituted in a spinel phase, and a method of controlling substitution sites in a spinel phase can be adopted.

The Hexagonal (system) ferrite magnetic powder used in the present invention is generally a powder having a hexagonal tabular shape.

Sizes of Hexagonal (system) ferrite magnetic powders and various other powders (which are referred to as powder sizes hereinafter) can be determined from high-resolution transmission electron micrographs of the powders. The magnetic powder size of the present invention is also determined by such a method. Specifically, the powder size is represented by a length of the major (long) axis of powder in a case (1) where the powder has an acicular, spindle or columnar shape (provided that the column height is greater than the greatest diameter of the column base), or by the greatest diameter of a tablet surface or a column base in a case (2) where the powder has a tabular or columnar shape (provided that the tablet thickness or the column height is smaller than the greatest diameter of the tablet surface or the column base, respectively) or by an equivalent circle diameter in a case (3) where the powder has a spherical shape, a polyhedral shape or an irregular shape in which its major axis is not determined. The term "equivalent circle diameter" is a diameter determined by a circle projection method.

An average size of the powder is an arithmetic mean of the powder size data determined by the method mentioned above. Herein, the size data of about 350 primary particles is averaged out. The term "primary particles" refers to the powder consisting of particles in a state of being mutually independent and not agglomerating.

An average acicular ratio of the powder refers to an arithmetic mean of the data on the major (i.e., long) axis length/minor (i.e., short) axis length ratio of the powder. The minor (i.e., short) axis length data used herein is obtained by minor (i.e., short) axis length measurements of about 350 primary particles. These measurements are made in accordance with the same method as described above. Herein, the term minor (i.e., short) axis length refers to the length of a shorter axis of a powder when the powder fits the case of powder size definition (1); while it refers to the thickness or the height of a powder when the powder fits the case of powder size definition (2). When a powder fits the case of powder size definition (3), however, there is no distinction between the major axis and the minor axis, so the long axis length/short axis length ratio is regarded as 1 for the convenience sake.

Further, when the powder has a specific shape, e.g., in the case of powder size definition (1), the average powder size refers to an average major (i.e., long) axis length; while, in the case of powder size definition (2), the average powder size refers to an average tabular diameter and the average tabular ratio refers to an arithmetic means of the greatest diameter/thickness or height ratio data. In the case of powder size definition (3), the average powder size refers to an average particle diameter.

In the present invention, it is appropriate that the average tabular diameter of Hexagonal (system) ferrite magnetic powder be from 10 to 35 nm, preferably from 15 to 35 nm. When the powder used is too small in average tabular diameter, the specific surface area thereof becomes great, so the powder is hard to disperse. When the powder used is too great in average tabular diameter, conversely, the particle volume thereof becomes great to cause an increase in medium noise, so a recording medium using such a powder cannot have a high C/N ratio.

Further, the suitable average thickness of the magnetic powder is generally from 2 to 15 nm, particularly preferably from 4 to 10 nm. And the suitable average tabular ratio is from 1.5 to 4, preferably from 2 to 3.8.

In addition, it is appropriate that the specific surface areas of those Hexagonal (system) ferrite magnetic powders be generally from 25 to 100 m$^2$/g, especially from 40 to 80 m$^2$/g, as measured by BET method. When the powder used has a specific surface area of smaller than 25 m$^2$/g, medium noise tends to be increased; while, when the specific surface area of a powder used is greater than 100 m$^2$/g, the powder is hard to disperse and the resulting recording medium tends to have unsatisfactory surface properties. Furthermore, the suitable water content in a powder used is from 0.3 to 2.0%. And it is appropriate that the water content in the magnetic powder be optimized depending on the kind of a binder used together with the magnetic powder. It is also appropriate to optimize the pH of the magnetic powder depending on a binder used in combination with the magnetic powder. The suitable range of the pH is from 4 to 12, preferably from 6 to 10. The magnetic powder may undergo a surface treatment with an oxide or hydroxide of a metal, such as Al, Si, P, Zr or Mg, if needed. In the surface treatment, it is preferable to use $Al_2O_3 \cdot nH_2O$ or $SiO_2 \cdot nH_2O$. And it is desirable to adjust a substance used for surface treatment in amount and proportion depending on the binder used. Specifically, the proportion of a substance used for surface treatment to the magnetic powder is from 0.1 to 10% by weight (i.e., by mass). Such surface treatment has an advantage in controlling adsorption of a lubricant, such as a fatty acid, to 100 mg/m$^2$ or below. Although there are cases where the magnetic powders used contain inorganic ions of soluble salt origin, such as Na, Ca, Fe, Ni or Sr ions, the result obtained becomes better the lower the inorganic ions are in total content, and those ions have negligible influence upon characteristics of the magnetic powder so far as the total content thereof is 100 ppm or below. The saturation magnetization ($\sigma$s) of the magnetic powder is at least 35 A·m$^2$/kg, preferably at least 40A·m$^2$/kg, and the suitable tap density of the magnetic powder is at least 0.5 g/ml, preferably at least 0.8 g/ml.

The Hexagonal (system) ferrite magnetic powder used in the present invention has a coercive force Hc of 135 to 400 kA/m, preferably 140 to 350 kA/m, particularly preferably 150 to 330 kA/m. When the coercive force is too small, the short-wavelength output is hard to produce. On the other hand, too great coercive force makes it difficult to satisfactorily record signals with a recording head.

Hexagonal (system) ferrite magnetic powders can be prepared by a glass crystallization method, a coprecipitation method or a hydrothermal reaction method, and any of these methods may be used in the present invention. However, the glass crystallization method has an advantage of providing fine particles having a satisfactory size distribution.

In addition to the Hexagonal (system) ferrite magnetic powders specified above, other magnetic powders may be mixed in an amount of not impairing effects of the present invention. More specifically, it is appropriate that the other magnetic powders be mixed in a proportion of 20% or below based on the total magnetic powders.

The anisotropic magnetic field Hk of the magnetic layer can be strengthened by controlling the composition and the shape (tabular thickness, tabular ratio) of Hexagonal (system) ferrite to the ranges specified above. Strengthening the anisotropic magnetic field Hk is in keeping with the direction of increasing a value of Ku (magnetic anisotropic constant), and can heighten the thermal stability of magnetization. Therefore, making a Hk value great is desirable for achievement of the present object.

The anisotropic field Hk of a magnetic layer to constitute the magnetic recording medium of the present invention is at least 358 kA/m, preferably from 390 to 800 kA/m.

Further, the coercive force Hc of the magnetic layer is controlled to the range of 135 kA/m to 440 kA/m, preferably to the range of 150 kA/m to 400 kA/m. When the coercive force Hc is too small, high-density recording is difficult to attain. On the other hand, too large coercive force Hc causes problems that signals cannot be recorded satisfactorily with a magnetic head and overwriting characteristics are deteriorated.

The coercive force setting depends greatly on the material of a head used for recording (e.g., whether or not the material having a high saturation magnetic flux density (Bs), such as Fe—Ta—N, is used for the head) and a head performance, and it is made as appropriate.

The rotational hysteresis loss integral of the magnetic layer of the magnetic recording medium of the present invention is from 0.5 to 0.95, preferably from 0.50 to 0.93, particularly preferably from 0.50 to 0.90.

The suitable coercive force/anisotropic magnetic field (Hc/Hk) ratio is from 0.3 to 0.6, preferably from 0.35 to 0.6.

In order to prevent reproduction output from deteriorating due to saturation of an MR head, it is appropriate that the product of a residual magnetic flux density (Br) and a magnetic layer thickness ($\delta$) be from 0.5 to 100 mT·$\mu$m. The product greater than 100 mT·$\mu$m is undesirable because saturation of an MR head tends to occur. The suitable residual magnetic flux density is from 50 to 150 mT, preferably from 55 to 130 mT. And the suitable magnetic layer thickness is from 0.01 to 0.5 $\mu$m, preferably from 0.02 to 0.3 $\mu$m.

The suitable decay slope of magnetization ($\Delta$S) is from 0 to 0.05, preferably from 0 to 0.045.

The $\Delta$S value is determined by performing DC saturation magnetization, applying the same magnetic field as in magnitude with the magnetic tape's Hc but opposite in direction thereto, measuring decay of magnetization over a period of 1,000 seconds, determining a slope (S) of magnetization decay between 10 to 1,000 seconds with respect to ln t (t is a time expressed in second), and then standardizing the slope (S) by the residual magnetization Mr.

The suitable thermal fluctuation magnetic field (Hf) is from 0 to 2.0 A/m, preferably from 0 to 1.8 A/m. Small Hf is advantageous because thermal fluctuation stability becomes high. The thermal fluctuation magnetic field Hf can be calculated from Hf=S/$\chi_{irre}$ wherein $\chi_{irre}$ is an irreversible magnetic susceptibility determined from a remanence curve (the numeric values of magnetic field strength in the vicinity of Hc are utilized). By use of the Hf value thus calculated, the activation volume Va can be calculated from Va=kT/(Ms·Hf) (wherein k is Boltzmann constant, T is an absolute temperature and Ms is saturation magnetization per volume).

Further, from the viewpoint of reducing interaction between particles, it is appropriate that the squareness ratio (SQ) of the magnetic layer be from 0.50 to 0.64, preferably from 0.53 to 0.64.

The magnetic layer to constitute the magnetic recording medium of the present invention contains a binder resin in addition to the magnetic powder as described above. Examples of a binder resin usable therein include known thermoplastic resins, thermosetting resins, reactive resins and mixtures thereof.

In the case of thermoplastic resins, it is appropriate that their glass transition temperatures be from −100 to 150° C., their number average molecular weights be from 1,000 to 200,000, preferably from 10,000 to 100,000, and their polymerization degrees be from about 50 to about 1,000.

Suitable examples of a thermoplastic resin include homo- or copolymer containing as constitutional units vinyl chloride, vinyl acetate, vinyl alcohol, maleic acid, acrylic acid, acrylate vinylidene chloride, acrylonitrile, methacrylic acid, methacrylate, styrene, butadiene, ethylene, vinyl butyral, vinyl acetal and vinyl ether, polyurethane resin and various rubber resins.

Suitable examples of a thermosetting resin or a reactive resin include phenol resin, epoxy resin, polyurethane curing resin, urea resin, melamine resin, alkyd resin, acrylic reactive resin, formaldehyde resin, silicone resin, epoxy-polyamide resin, a mixture of polyester resin and isocyanate prepolymer, a mixture of polyester polyol and polyisocyanate, and a mixture of polyurethane and polyisocyanate.

If required for producing more excellent effect on dispersion of ferromagnetic powder and giving higher durability to the magnetic layer, at least one polar group selected from COOM, $SO_3M$, $OSO_3M$, $P=O(OM)_2$, $O-P=O(OM)_2$ (wherein M is a hydrogen atom or an alkali metal base), OH, $NR_2$, $N^+R_3$ (wherein R is an alkyl group, an alkenyl group, an acyl group or an aryl group), an epoxy group, SH or CN may be introduced into the binder resins as described above by copolymerization or addition reaction. The suitable content of those polar groups in a binder resin is from $10^{-1}$ to $10^{-8}$ mole/g, preferably from $10^{-2}$ to $10^{-6}$ mole/g.

In the magnetic layer of the magnetic recording medium of the present invention, the binder resin is used in a proportion of 5 to 50 weight %, preferably 10 to 30 weight %, based on the ferromagnetic powder. Especially, in the case of use of a vinyl chloride resin, 5 to 100 weight % of vinyl chloride resin is used., and in the case of use of a polyurethane resin, 2 to 50 weight % of polyurethane resin and 2 to 100 weight % of polyisocyanate are used.

Examples of vinyl chloride resin include copolymer of vinyl chlorine and vinyl acetate, copolymer of vinyl chloride and (meth) acrylate, copolymer of vinyl chloride, vinyl acetate and vinyl alcohol, maleic acid and/or acrylic acid, copolymer of vinyl chloride and vinyl propionate, copolymer of vinyl chloride and vinylidene chloride, and copolymer of vinyl chloride and acrylonitrile.

Examples of polyurethane resin include polyester polyurethane, polyether polyurethane, polyether polyester polyurethane, polycarbonate polyurethane, polyester polycarbonate polyurethane, and polycaprolactone polyurethane.

When polyurethane is used as a binder resin in the magnetic layer to constitute the magnetic recording medium of the present invention, it is appropriate for the polyurethane to have a glass transition temperature of −50° C. to 100° C., an elongation at break of 100% to 2,000%, a breaking stress of 0.05 Kg/mm² to 10 Kg/mm² (0.49 MPa to 98 MPa) and a yield point of 0.05 Kg/mm² to 10 Kg/mm² (0.49 MPa to 98 MPa).

Examples of polyisocyanate usable herein include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates as condensation products of isocyanates.

Commercially available products of the isocyanates as described above are, e.g., Coronate L, Coronate HL, Coronate 2030, Coronate 2031, Millionate MR and Millionate MTL (trade names, produced by Nippon Polyurethane Co., Ltd.), Takenate D-102, TakenateD-110N, TakenateD-200 and TakenateD-202 (trade names, produced by Takeda Chemical Industries, Ltd.), and Desmodur L, Desmodur IL, Desmodur N and Desmodur HL (trade names, produced by Sumitomo Bayer Co., Ltd.). These products may be used alone or as a combination made of at least two products utilizing a difference in curing reactivity.

The packing degree of a Hexagonal (system) ferrite magnetic powder in the magnetic layer can be calculated from $\sigma_s$ (saturation magnetization) and the maximum magnetic flux density (Bm) of a Hexagonal (system) ferrite magnetic powder used, and specifically expressed as $Bm/4\pi\sigma_s$. The suitable packing degree in the present invention is 1.1 g/cm³ to 3.2 g/cm³, preferably 1.2 g/cm³ to 3.0 g/cm³.

Besides containing the magnetic powder and the binder resin as described above, the magnetic layer of the magnetic recording medium of the present invention can generally contain ingredients having various functions, such as a lubricant, an abrasive, a dispersing agent, an antistatic agent, a plasticizer and an antimold, depending on the desired purpose.

Examples of a lubricant usable in the magnetic layer of the present invention include silicone oils, such as dialkylpolysiloxanes (wherein each alkyl group contains 1 to 5 carbon atoms), dialkoxypolysiloxanes (wherein each alkoxy group contains 1 to 4 carbon atoms), monoalkyl-monoalkoxypolysiloxanes (wherein each alkyl group contains 1 to 5 carbon atoms and each alkoxy group contains 1 to 4 carbon atoms), phenylpolysiloxanes and fluoroalkylpolysiloxanes (wherein each alkyl group contains 1 to 4 carbon atoms); electro-conductive fine powders such as graphite; inorganic powders, such as molybdenum disulfide and tungsten disulfide; fine powders of plastics, such as polyethylene, polypropylene, ethylene-vinyl chloride copolymer and poly(tetrafluoroethylene); α-olefin polymers; saturated fatty acids in a solid state at room temperature (containing 10 to 22 carbon atoms); unsaturated aliphatic hydrocarbon in a liquid state at room temperature (compounds having terminal carbons to which n-olefin double bonds are attached and containing about 20 carbon atoms); fatty acid esters produced from monobasic fatty acids having 12 to 20 carbon atoms and monohydric alcohol compounds having 3 to 12 carbon atoms; and fluorocarbons.

Of those lubricants, saturated fatty acids and fatty acid esters are preferred. In particular, it is advantageous to use them in combination. Examples of alcohol as a starting material of fatty acid ester include monohydric alcohol, such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether or s-butyl alcohol; and polyhydric alcohol, such as ethylene glycol, diethylene glycol, neopentyl glycol, glycerin or sorbitan derivatives. Examples of fatty acid as the other starting material include aliphatic carboxylic acids, such as acetic acid, propionic acid, octanoic acid, 2-ethylhexanolic acid, lauric acid, myristic acid, stearic acid, palmitic acid, behenic acid, arachic acid, oleic acid, linolic acid, linolenic acid, elaidic acid and palmitoleic acid, and mixtures of these acids.

Examples of fatty acid esters prepared from those starting materials, include various ester compounds, such as butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, a product obtained by acylating dipropylene glycol monobutyl ether with stearic acid, diethylene glycol dipalmitate, hexamethylenediol acylated with myristic acid, and glycerin oleate.

For the purpose of reducing hydrolysis of fatty acid esters which often occur when the magnetic recording media are used under high-humidity conditions, fatty acids and alcohol compounds as starting materials are selected properly from their various isomers, e.g., branched or linear isomers, or cis or trans isomers, and selected so as to have appropriate branched positions.

These lubricants are added in a proportion of 0.2 to 20 parts by weight per 100 parts by weight of binder.

Further, the compounds described below are also usable as lubricants. Specifically, silicone oil, graphite, molybdenum disulfide, boron nitride, graphite fluoride, fluorinated alcohol, polyolefin, polyglycol, alkyl phosphate and tungsten disulfide are included in such lubricants.

Abrasives usable in the magnetic layer of the present invention are generally used materials, with examples including α-alumina, γ-alumina, molten alumina, corundum, artificial corundum, silicon carbide, chromium oxide ($Cr_2O_3$), diamond, artificial diamond, garnet, emery (main components: corundum and magnetite) and α-$Fe_2O_3$. Of these abrasives, the materials having Mohs' hardness of at least 6 are preferred. Examples of commercially available abrasives include AKP-10, AKP-15, AKP-20, AKP-30, AKP-50, AKP-1520, AKP-1500, HIT-50, HIT60A, HIT60G, HIT70, HIT80, HIT82 and HIT-100 which are products of Sumitomo Chemical Co., Ltd., G5, G7, S-1 and chromium oxide K which are products of Nippon Chemical Industrial Co., Ltd., UB40B which is a product of Uemura Kogyo Co., Ltd., WA8000 and WA10000 which are products of Fujimi Abrasives Co., Ltd., LS600F 0/-1/4 which is a product of LANDS Co., Ltd., MD-200, MD-150, MD-100, MD-70, IRM 0-1/4F and IRM 0-1/4FF which are products of Tomei Dia Co., Ltd., 0-1/10 and 0-1/4 which are products of GE, Myporex 1/10QG and 1/8QG which are products of Du Pont, and TF100, TF140 and TF180 which are products of Toda Kogyo K.K. The abrasives measuring from 0.05 to 1 μm in average particle size are effective, and their average particle sizes are preferably from 0.05 to 0.5 μm.

Not only independent use but also combined use of abrasives is suitable. For instance, the combined use of fine-grained diamond and another abrasive makes it possible to reduce a proportion of the diamond added to the magnetic powder to about 0.1%. The total amount of abrasives added is from 1 to 20 parts by weight, preferably from 1 to 15 parts by weight, per 100 parts by weight of magnetic powder. When the abrasives are added in a total amount smaller than 1 parts by weight, sufficient durability cannot be achieved. When the total amount is greater than 20 parts by weight, on the other hand, deterioration in surface properties and filling degree tends to occur. These abrasives may be added to a magnetic coating composition after they are dispersed in a binder.

The magnetic layer of the magnetic recording medium of the present invention can also contain electrically conductive particles as an antistatic agent. In particular, addition of carbon black as the antistatic agent is advantageous because it can lower surface electric resistance of the medium as a whole. Examples of carbon black usable in the present invention, include furnace black for rubber, thermal black for rubber, carbon black for color, electrically conductive carbon black and acetylene black. The suitable carbon black has its specific surface area in the range of 5 to 500 $m^2$/g, and its DBP absorptive capacity in the range of 10 to 1500 ml/100 g, its particle size in the range of 5 to 300 nm. Further, it is appropriate that the pH, water content and tap density of the carbon black used be from 2 to 10, from 0.1 to 10% and from 0.1 to 1 g/ml, respectively. Examples of commercial carbon black which can be used in the present invention include BLACKPEARLS 2000, 1300, 1000, 900, 800 and 700, and VULCAN XC-72 which are products of Cabot Co., #80, #60, #55, #50 and #35 which are products of Asahi Carbon Co., Ltd., #3030B, #3040B, #3050B, #3230B, #3350B, #9180B, #2700, #2650, #2600, #2400B, #2300, #950, #900, #1000, #95, #30, #40, #10B, MA230, MA220 and MA77 which are products of Mitsubishi Chemical Ltd., CONDUCTEX SC, RAVEN 150, 50, 40 and 15 which are products of Columbia Carbon Co., and ketjen black EC, ketjen black ECDJ-500 and ketjen black ECDJ-600 which are products of Lion Akzo Co., Ltd. In advance of its use, carbon black may be surface-treated with a dispersing agent or subjected to oxidation treatment, a resin may be grafted onto carbon black, or carbon black surface may be partly converted into graphite. On the other hand, carbon black may be dispersed into a binder before it is added to a coating composition. When the carbon black is used in the magnetic layer, it is appropriate to use it in a proportion of 0.1 to 30 weight % based on the magnetic powder. Further, it is suitable to incorporate the carbon black in a nonmagnetic layer described hereinafter in a proportion of 3 to 20 weight % based on the total nonmagnetic powders.

In general carbon black functions not only as an antistatic agent but also as a friction coefficient reducer, a light shield or a film strength improver. The functions vary with carbon black products. Therefore, in consideration of kind, amount, combination and various properties including particle size, oil absorption, electric conductivity and pH, the carbon black used in the present invention can be selected from those carbon black products so as to suite the desired purpose. Details of carbon black usable in the present invention can refer to, e.g., *Carbon Black Binran* (*which may be translated by the English title "Handbook of Carbon Black"*), compiled by Carbon Black Association.

The magnetic recording medium of the present invention which has the magnetic layer containing a Hexagonal (system) ferrite magnetic powder can have any of well-known layer structures as far as a non-magnetic layer is provided between the magnetic layer and a support.

The non-magnetic layer which constitutes the magnetic recording medium of the present invention is described below.

The non-magnetic layer (lower layer) contains a non-magnetic powder in a state of dispersion in a binder resin. As the non-magnetic powder, various kinds of powders can be used. Examples of such powders include aluminum oxide having an α-alumina having α-conversion of at least 90%, β-alumina, γ-alumina, silicon carbide, chromium oxide, cerium oxide, α-iron oxide, goethite, corundum, silicon nitride, titanium carbide, titanium dioxide, silicon dioxide, boron nitride, zinc oxide, calcium carbonate, calcium sulfate and barium sulfate. These compounds may be used alone or as mixtures of two or more thereof. Of the compounds described above, α-iron oxide, goethite, titanium dioxide and zinc oxide are preferred because they are fine powders having a narrow particle size distribution. It is appropriate that those non-magnetic powders have their particle sizes in the range of 0.01 to 1 μm. However, if desired, the average particle size may fall within such a range by the combined use of non-magnetic powders differing in particle size or by independent use of a non-magnetic powder having a broad particle size distribution. For strengthening interaction with a binder resin used together and improving dispersibility, the non-magnetic powder may be subjected to surface treatment before use. Examples of a substance which may be present on the particle surface by the surface treatment include an inorganic substance, such as silica, alumina or silica-alumina, and a reaction product with a coupling agent. The non-magnetic powder suitably used in the present invention has a tap density of 0.3 to 2 $g/cm^3$, a water content of 0.1 to 5 weight %, a pH value of 2 to 11, and a specific surface area of 5 to 100 $m^2/g$. The shape of the non-magnetic powder may be any of acicular, spherical, cubic (i.e., die-shaped) and tabular shapes.

Examples of a non-magnetic powder usable for the present lower layer include Nanotite produced by Showa Denko K.K., HIT-100 and HIT-80 produced by Sumitomo Chemical Co., Ltd., DPN-250BX, DPN-245, DPN-270BX, DPN-550BX, DPN-550RX, DBN-450BX, DBN-650RX and DAN-850RX which are α-iron oxide products of Toda Kogyo K.K., TTO-51B, TTO-55A, TTO-55B, TTO-55C, TTO-55S, TTO-55D and SN-100 which are titanium dioxide products of Ishihara Sangyo, STT-4D, STT-30D, STT-30 and STT-65C which are titanium dioxide products of Titan Kogyo, MT-100S, MT-100T, MT-150W, MT-500B, MT-600B, MT-100F and MT-500HD which are titanium dioxide products of TAYCA Corp., FINEX-25, BF-1, BF-10, BF-20 and ST-M produced by Sakai Chemical Industry Co., Ltd., DEFIC-Y and DEFIC-R which are iron oxide products of Dowa Mining Co., Ltd., AS2BM and $TiO_2$ P25 produced by Nippon Aerosil Corporated, and 100A, 500A and burned substances thereof produced by Ube Industries Ltd.

As a binder contained in the non-magnetic layer constituting the magnetic recording medium of the present invention, various resins described as binder resins usable in the magnetic layer can be used. In addition to the non-magnetic powder and the binder resin, various additives including an abrasive, a lubricant and an antistatic agent can be added to the non-magnetic layer. Examples of compounds usable as these additives include the same ones as described as the additives usable in the magnetic layer.

The thickness of a support of the magnetic recording medium of the present invention is generally from 3 to 100 μm. Preferably, it is from 3 to 20 μm when the medium is used in the form of tape, while it is from 25 to 80 μm when the medium is used as flexible disk. The thickness of the non-magnetic layer provided on a support is generally from 0.5 to 5.0 μm, preferably from 0.5 to 3 μm. The thickness of the magnetic layer is preferably from 0.01 to 0.5 μm, particularly preferably from 0.05 to 0.3 μm. Layers other than the magnetic layer and the non-magnetic layer can further be formed with the reference to the purpose. For instance, a subbing layer (i.e., an undercoating layer) for enhancing adhesion may be provided between the support and the lower layer. The thickness of the subbing layer is generally from 0.01 to 1 μm, preferably from 0.05 to 0.3 μm. In addition, the support may be provided with a backing layer on the side opposite to the magnetic layer. The thickness of the backing layer is generally from 0.1 to 1.0 μm, preferably from 0.2 to 0.8 μm. These subbing and backing layers may be any of known ones respectively. When the magnetic recording medium has a disk shape, the magnetic layer can be provided on one side or both sides of the support.

The support used in the present invention has no particular restrictions, but any of generally used support materials can be applied thereto. Examples of a support material usable herein include films of various synthesis resins, such as polyethylene terephthalate, polyethylene, polypropylene, polycarbonate, polyethylene naphthalate, polyamide, polyamideimide, polyimide, polysulfone and polyether sulfone, and metallic foils, such as aluminum foil and stainless foil.

For effectively achieving the objects of the present invention, it is desirable that the surface roughness of the support be 0.03 μm or below, preferably 0.02 μm or below, and particularly preferably 0.01 μm or below in terms of a center-line average surface roughness [defined in JIS B 0601] (cut-off value: 0.25 nm). Besides being small in center-line average surface roughness, the present support is preferably free of coarse projections measuring 1 μm or above in height. The surface roughness dimensions can be adjusted freely by selecting sizes and amounts of fillers added to the support as needed. Examples of such fillers include inorganic fine powders of oxides or carbonates of Al, Ca, Si and Ti, and organic fine powders of acrylic resins. The suitable F-5 values of a support used in the present invention are from 5 to 50 $kg/mm^2$ (49 to 490 MPa) in the web-running direction (i.e., the machine direction) and from 3 to 30 $kg/mm^2$ (29.4 to 294 MPa) in the direction of web width (i.e., transverse) direction. The F-5 value is generally higher in the web length direction (i.e., the machine direction) than in the web width direction (i.e., the transverse direction), but this relation needs not apply in special cases where the necessity of heightening the strength in the width direction arises.

The suitable thermal shrinkage ratio of the support in both web-running and width directions is not more than 3%, preferably not more than 1.5%, under heating at 100° C. for 30 minutes, and not more than 1%, preferably not more than 0.5%, under heating at 80° C. for 30 minutes. It is advantageous for the support to have its breaking strength of 5 to 100 $kg/mm^2$ (49 to 980 MPa) in both directions, and its elasticity modulus of 100 to 2,000 $kg/mm^2$ (980 to 1960 MPa). In the magnetic layer and the non-magnetic layer which constitute the magnetic recording medium of the present invention, organic solvents are generally used. Examples of an organic solvent usable therein include ketones, such as acetone, methyl ethyl ketone, methyl isobutyl ketone, diisobutyl ketone, cyclohexanone, isophorone and tetrahydrofuran; alcohol substances, such as methanol, ethanol, propanol, butanol, isobutyl alcohol, isopropyl alcohol and methylcyclohexanol; esters, such as methyl acetate, butyl acetate, isobutyl acetate, isopropyl acetate, ethyl lactate and glycol acetate; glycol ethers, such as glycol dimethyl ether, glycol monoethyl ether and dioxane; aromatic hydrocarbons, such as benzene, toluene, xylene, cresol and chlorobenzene; chlorinated hydrocarbons, such as methylene chloride, ethylene chloride, carbon tetrachloride, chloroform, ethylene chlorohydrin and dichlorobenzene; N,N-dimethylformamide; and hexane. These solvents can be used in combination, and that in arbitrary proportions. And they are not always required to be 100% pure, but may contain impurities, such as isomers, unreacted materials, by-products, decomposed matter, oxides and moisture. The allowable level of contamination with such impurities is 30 weight % or less, preferably 10 weight % or less. The solvents used in the constituent layers may be different in kind and amount, if desired. For instance, a highly volatile solvent is used in the non-magnetic layer to improve the surface properties, a solvent having high surface tension (such as cyclohexanone or dioxane) is used in the non-magnetic layer to raise the coating consistency, or a solvent having a great solubility parameter is used in the magnetic layer to increase a degree of filling. Of course, uses for solvents should not be construed as being limited to those cases.

The magnetic recording medium of the present invention is produced by providing on a support a non-magnetic layer containing a non-magnetic powder and a binder, coating on the non-magnetic layer a magnetic coating composition prepared by kneading and dispersing a ferromagnetic powder and a binder resin as described above, if desired, together with other additives with an organic solvent, coating the coating composition, subjecting to orientation, and then drying the coating.

Each of processes of preparing a magnetic coating composition to form a magnetic layer and a non-magnetic coating composition to form a non-magnetic layer for the magnetic recording medium of the present invention comprises a kneading step, dispersing step and, if required, mixing steps inserted before or after each of these steps. Each step may be parted into at least two stages. All the ingredients used in the present invention, including a magnetic powder, a non-magnetic powder, a binder, carbon black, an abrasive, an antistatic agent, a lubricant and a solvent, may be added at the start of or halfway through any of the steps. Further, each ingredient may be divided into at least two portions, and these portions may be added in separate steps. For instance, polyurethane may be divided into three portions, and these portions may be separately introduced in the kneading step, the dispersing step and the mixing step for viscosity adjustment after dispersion, respectively.

In kneading and dispersing the magnetic coating composition, various kneading machines can be used. Examples of a kneading machine usable herein include a two-rod roll mill, a three-rod roll mill, a ball mill, a pebble mill, a trommel, a sand grinder, Szegvari, an attrition mill, a high-speed impeller dispersing machine, a high-speed stone mill, a high-speed impact mill, a disper, a kneader, a high-speedmixer, a homogenizer and a ultrasonic dispersing machine.

In the kneading step, it is advantageous to use a mighty kneading machine, such as a continuous kneader or a pressurized kneader, from the viewpoint of ensuring high Br in the magnetic recording medium. In the case of using a continuous or pressurized kneader, a binder in all or a part of the required amount (preferably at least 30 weight % of the required amount of binder used), a magnetic powder in all or a part of the required amount and other ingredients used as required are placed in the kneader, and kneaded with an organic solvent added thereto in a proportion of 15 to 500 parts by weight to 100 parts by weight of the magnetic powder. The details of kneading treatment are described in JP-A-1-106338 and JP-A-64-79274. In the present invention, the simultaneous multilayer coating method as disclosed in JP-A-62-212933 is adopted to achieve efficient production.

Formation of a plurality of coating layers on a support is effective in producing a magnetic recording medium of a high recording density, and the simultaneous coating method is an excellent method because a very thin magnetic layer can be formed thereby. The following are examples of the simultaneous coating method, namely a wet-on-wet coating method.

(1) A method comprises forming a lower layer on a support by the use of a coating machine usually applied in coating magnetic coating compositions, such as a gravure, roll, blade or extrusion coater and, while the lower layer is in an undried condition, coating an upper layer thereon by the use of a pressurized support type extrusion coating machine as disclosed in JP-B-1-46186 (the term "JP-B" as used herein means an "examined Japanese Patent publication"), JP-A-60-238179 and JP-A-2-265672.

(2) A method comprises coating an upper layer and a lower layer almost simultaneously by the use of a coating head having two slits for passage of coating compositions as disclosed in JP-A-63-88080, JP-A-2-17971 and JP-A-2-265672.

(3) A method comprises coating an upper layer and a lower layer almost simultaneously by the use of a backup roll-attached extrusion coater as disclosed in JP-A-2-174965.

When the wet-on-wet method is adopted for coating, disturbance at the interface between the coated magnetic and non-magnetic layers and variations in the thickness of the coated magnetic layer can be minimized by approximating fluidity characteristics of a coating composition for the magnetic layer as closely as possible to those for the non-magnetic layer. The fluidity characteristics of a coating composition depend largely on what powder particles and binder resin are combined in the coating composition. Therefore, it is required to pay particular attention to selection of a non-magnetic powder used in the non-magnetic layer.

The appropriate content of a residual solvent in the magnetic layer is 100 mg/m$^2$ or below, preferably 10 mg/m$^2$ or below, and it is preferable that the residual solvent content in the magnetic layer is lower than that in the non-magnetic layer. The suitable voidage of the non-magnetic layer and that of the magnetic layer are both 30 volume % or below, preferably 10 volume % or below. It is appropriate that the voidage of the non-magnetic layer be greater than that of the magnetic layer. However, the voidage of the non-magnetic layer may be smaller than that of the magnetic layer so far as it is not smaller than 5 volume %.

It is easily inferred that the non-magnetic layer and the magnetic layer may differ in those physical characteristics depending on the intended purpose. For instance, the running durability is enhanced by elevating a elasticity modulus of the magnetic layer, and at the same time the elasticity modulus of the non-magnetic layer is rendered lower than that of the magnetic layer to better a head touch on the magnetic recording medium.

The magnetic layer coated over the support in the aforementioned manner is subjected to orientation of the ferromagnetic powder incorporated therein, if needed, and then dried. Further, the magnetic layer is subjected to surface smoothening treatment, if desired. The material thus treated is cut into the desired shape, thereby producing the magnetic recording medium of the present invention.

The suitable elasticity modulus of the magnetic layer under 0.5% elongation is from 100 to 2,000 kg/mm$^2$ (980 to 19,600 MPa) in each of coating and width directions of the web, and the appropriate breaking strength is from 1 to 30 kg/cm$^2$ (98 to 2,940 PMa). The suitable elasticity modulus of the magnetic recording medium in each of coating and width directions of the web is from 100 to 1,500 kg/mm² (980 to 14,700 MPa), the appropriate residual elongation is not more than 0.5%, and the appropriate thermal shrinkage ratio at all temperatures of no higher than 100° C. is not more than 1%, preferably not more than 0.5%, particularly preferably not more than 0.1%.

The magnetic recording medium of the present invention may be a tape for video or backup of computer files, or a floppy or magnetic disk for data recording. In particular, the magnetic recording medium of the present invention is highly effective as a medium for digital recording to which a loss of signals caused by dropout is fatal. Moreover, when a double-layer structure constituted of a non-magnetic layer and a magnetic layer is given to the magnetic recording medium of the present invention and the thickness of the magnetic layer is reduced to 0.5 μm or below, the resultant recording medium can have high electromagnetic (conversion) characteristics and excellent overwrite characteristic and can achieve high-density and large-volume recording.

EXAMPLE

The features of the present invention will now be illustrated in more detail by reference to the following examples. However, the present invention should not be construed as being limited to these examples.

<Production Examples 1 to 5 and Comparative Production Example 1 of Hexagonal (System) Ferrite Magnetic Powders>

As starting materials for Hexagonal (system) ferrite production, various compounds were weighed out in the following amounts on an oxide basis. The amounts X, Y and Z of the components set forth below and the magnetic powders produced are shown in Table 1.

| | |
|---|---|
| $B_2O_3$ | 4.7 moles |
| $BaCO_3$ | 10.0 moles |
| $Fe_2O_3$ | X moles |
| $CoCO_3$ | 0.05 × X moles |
| ZnO | Y moles |
| $Nb_2O_5$ | Z moles |

The foregoing composition, except for $B_2O_3$, was dissolved in 120° C. citric acid, made into a homogeneous mixing as it was kept at about 200° C., and hydrolyzed at 450° C. Further, the hydrolysis product was burned at 600° C. in the air, and the free carbon was removed. Thereto, $B_2O_3$ was added, and mixed thoroughly with a powder mixer. The resultant mixture was put in a stirrer-attached Pt—Rh crucible, molten for 2 hours at a temperature of 1300–1350° C., and further extruded between a pair of rotating stainless-made cooling rolls to give an amorphous matter. Then, the amorphous material was pulverized.

The pulverized amorphous material was placed in a ceramic vessel so as to be spread in a thickness of 2 cm, and fed into an electric furnace kept at 650° C. and made to stay therein for 2 hours. Immediately thereafter, the crucible was transferred to an electric furnace kept at 850° C. and made to stay therein for 3 hours. The thus processed matter was charged into a room-temperature metallic hopper, and thereby cooled. Thus, a crystalline powder was obtained. Further, the crystalline powder was ground with a planetary mill, immersed in 2 mole/l aqueous solution of acetic acid, and kept at 80° C. for 5 hours to remove a glass component. The resulting solution was filtered and microcrystals were recovered. The recovered microcrystals were washed with a large amount of ion-exchanged water, dehydrated, dried at 100° C., and further subjected to consolidation treatment with muller. Thus, a ferromagnetic powder was obtained.

By X-ray diffraction analysis, it was proved that the ferromagnetic powder had a magnetoplumbite structure. This ferromagnetic powder was observed under a transmission electron microscope, and thereby the average particle size thereof was determined. Further, the ferromagnetic powder was degassed for 30 minutes at 250° C. in the atmosphere of nitrogen, and the specific surface area thereof was measured by BET method. The magnetic characteristics thereof were determined by the use of VSM under the applied magnetic filed of 800 kA/m. The composition, shape and magnetic characteristics of the ferromagnetic powder obtained are shown in Table 1.

In Comparative Production Example 1, the composition of starting materials was mixed with $B_2O_3$ without being dissolved in citric acid, and thereafter rendered amorphous (vitrified) in the same process as the powders in Production Examples, followed by crystallization. And therefrom was removed a residual glass component.

TABLE 1

| | Magnetic powder composition | | | Average tabular diameter (nm) | Average tabular thickness (nm) | Specific surface area (m²/g) | Coercive force Hc (kA/m) | σs (Am²/kg) |
|---|---|---|---|---|---|---|---|---|
| | X (mole) | Y (mole) | Z (mole) | | | | | |
| Production Example 1 | 11.3 | 0.50 | 0.11 | 22.7 | 6.6 | 67.2 | 168.5 | 50.2 |
| Production Example 2 | 11.9 | 0.35 | 0.11 | 22.2 | 7.0 | 68.3 | 190.5 | 51.8 |
| Production Example 3 | 12.5 | 0.20 | 0.11 | 22.4 | 6.8 | 67.8 | 233.2 | 52.2 |
| Production Example 4 | 13.1 | 0.20 | 0.08 | 19.5 | 6.5 | 74.6 | 196.9 | 47.4 |
| Production Example 5 | 10.8 | 0.65 | 0.13 | 34.8 | 10.3 | 35.1 | 136.2 | 55.4 |
| Comparative Production Example 1 | 10.8 | 0.65 | 0.13 | 42.5 | 12.2 | 30.2 | 133.6 | 55.5 |

<Preparation of Coating Composition>

In the following description, all parts are by weight unless otherwise indicated.

| Formula of Magnetic Coating Composition (1): | |
|---|---|
| Barium ferrite | 100 parts |
| Binder resin | |
| Vinyl chloride copolymer (containing 1 × 10$^{-4}$ eq/g of —SO$_3$K groups and having a polymerization degree of 300) | 12 parts |
| Polyester polyurethane resin (neopentyl glycol/caprolactone polyol/MDI = 0.9/2.6/1, —SO$_3$Na content: 1 × 10$^{-4}$ eq/g) | 4 parts |
| Phenylphosphonic acid | 3 parts |
| α-Alumina (average particle size: 0.15 μm) | 2 parts |
| Carbon black (average particle size: 30 nm) | 5 parts |
| Butyl stearate | 2 parts |
| Stearic acid | 2 parts |
| Methyl ethyl ketone | 125 parts |
| Cyclohexanone | 125 parts |

| Formula of Magnetic Coating Composition (2): | |
|---|---|
| Barium ferrite | 100 parts |
| Binder resin | |
| Vinyl chloride copolymer (containing 1 × 10$^{-4}$ eq/g of —SO$_3$K groups and having a polymerization degree of 300) | 15 parts |
| Polyester polyurethane resin (neopentyl glycol/caprolactone polyol/MDI = 0.9/2.6/1, —SO$_3$Na content: 1 × 10$^{-4}$ eq/g) | 6 parts |
| Phenylphosphonic acid | 3 parts |
| α-Alumina (average particle size: 0.15 μm) | 2 parts |
| Carbon black (average particle size: 30 nm) | 5 parts |
| Butyl stearate | 10 parts |
| Butoxyethyl stearate | 5 parts |
| Isohexadecyl stearate | 2 parts |
| Stearic acid | 3 parts |
| Methyl ethyl ketone | 125 parts |
| Cyclohexanone | 125 parts |

| Formula of Non-magnetic Coating Composition (1): | |
|---|---|
| Acicular hematite (specific surface area by BET method: 55 m$^2$/g, average major axis length: 0.10 μm, average acicular ratio: 7, pH: 8.8, Al hydroxide treatment: 1 weight % as Al$_2$O$_3$) | 80 parts |
| Carbon black (average particle size: 17 nm, DBP-oil absorbency: 80 ml/100 g, Specific surface area by BET method: 240 m$^2$/g, pH: 7.5) | 20 parts |
| Binder resin | |
| Vinyl chloride copolymer (containing 1 × 10$^{-4}$ eq/g of —SO$_3$K groups and having a polymerization degree of 300) | 12 parts |
| Polyester polyurethane resin (neopentyl glycol/caprolactone polyol/MDI = 0.9/2.6/1, —SO$_3$Na content: 1 × 10$^{-4}$ eq/g) | 4 parts |
| Phenylphosphonic acid | 3 parts |
| Butyl stearate | 3 parts |
| Stearic acid | 3 parts |
| 1:1 Mixture of methyl ethyl ketone and cyclohexanone | 280 parts |

| Formula of Non-magnetic Coating Composition (2): | |
|---|---|
| Acicular hematite (specific surface area by BET method: 55 m$^2$/g, average major axis length: 0.10 μm, average acicular ratio: 7, pH: 8.8, Al hydroxide treatment: 1 weight % as Al$_2$O$_3$) | 80 parts |
| Carbon black (average particle size: 17 nm, DBP-oil absorbency: 80 ml/100 g, Specific surface area by BET method: 240 m$^2$/g, pH: 7.5) | 20 parts |
| Binder resin | |
| Vinyl chloride copolymer (containing 1 × 10$^{-4}$ eq/g of —SO$_3$K groups and having a polymerization degree of 300) | 15 parts |
| Polyester polyurethane resin (neopentyl glycol/caprolactone polyol/MDI = 0.9/2.6/1, —SO$_3$Na content: 1 × 10$^{-4}$ eq/g) | 5 parts |
| Phenylphosphonic acid | 3 parts |
| α-Alumina (average particle size: 0.15 μm) | 2 parts |
| Carbon black (average particle size: 30 nm) | 5 parts |
| Butyl stearate | 10 parts |
| Butoxyethyl stearate | 5 parts |
| Isohexadecyl stearate | 2 parts |
| Stearic acid | 3 parts |
| 1:1 Mixture of methyl ethyl ketone and cyclohexanone | 280 parts |

For preparing each of the magnetic coating compositions (1) and (2) and the non-magnetic coating compositions (1) and (2), the pigment, the vinyl chloride copolymer and phenyl phosphonic acid were kneaded first with each of the solvents in 50 weight % of the amount prescribed by means of a kneader. Thereto, the polyurethane resin and the remaining ingredients were added, and the admixture was dispersed with a sand grinder. To the dispersion obtained, isocyanate was added in an amount of 15 parts in the cases of the non-magnetic coating compositions or 14 parts in the cases of the magnetic coating compositions. Each of the admixtures was further mixed with 30 parts of cyclohexanone, and filtered through a filter having an average pore size of 1 μm. Thus, the coating compositions for forming non-magnetic layers and those for forming magnetic layers were prepared individually.

<Production of Tapes: Examples 1 to 6 and Comparative Example 1>

The non-magnetic coating composition (1) for a non-magnetic layer was coated on a 7 μm-thick polyethylene terephthalate support so as to have a dry thickness of 1.5 μm. Immediately thereafter, the magnetic coating composition (1) was coated on the non-magnetic coating composition which was still in a wet state by use of a simultaneous wet multiple-layer coating technique. In each Example, coverage of the magnetic coating composition was controlled to form a layer having the intended thickness. Both layers thus coated on the support were passed through an orientation device while they were still in a wet state, and thereby orientation in the length direction (i.e., the machine direction) was achieved. More specifically, the orientation was performed by passing the coated material between rare earth magnets (surface magnetic flux: 500 mT), further passing through a solenoid magnet (magnetic flux density: 500 mT), then drying insides the solenoid to an extent to cause no return of the orientation, and further drying the magnetic layer, followed by reeling. The thus processed material was subjected to calendering treatment using a 7-stage calender made of metallic rolls under a roll temperature of 90° C. The web-shaped magnetic recording medium thus obtained was slit into 8 mm-wide tapes to prepare 8 mm video-tape samples.

The video-tape samples were each examined for coercive force Hc, anisotropic magnetic field Hk, rotational hysteresis loss integral RH, squareness ratio SQ, thermal fluctuation magnetic field (Hf), magnetic layer thickness δ, residual magnetic flux density×magnetic layer thickness (Br·δ), decay slope, surface roughness, output and C/N ratio. The evaluation results of those factors are shown in Table 2.

alternate magnetic field generators different in magnetic field strength. Specifically, the generators used were a device generating a magnetic field having strength of 24 kA/m at a frequency of 50 Hz and a device generating a magnetic field having strength of 12 kA/m at a frequency of 50 Hz, and random orientation was achieved. The percentage of orientation degree achieved therein was at least 98%.

The other surface of the support was subjected to the same coating, orientation and drying processes as described above.

TABLE 2

| | Magnetic powder used | Hc (kA/m) | Hk (kA/m) | RH | SQ | Hf (A/m) | σ (μm) | Br·δ (mT·μm) | Decay slope | Surface roughness (nm) | Output (dB) | C/N ratio (dB) |
|---|---|---|---|---|---|---|---|---|---|---|---|---|
| Example 1 | Production Example 1 | 175.2 | 461.1 | 0.82 | 0.615 | 1.17 | 0.16 | 12.9 | 0.036 | 2.6 | 3.4 | 6.5 |
| Example 2 | Production Example 2 | 202.4 | 643.2 | 0.75 | 0.623 | 1.14 | 0.15 | 13.3 | 0.035 | 2.5 | 3.9 | 6.2 |
| Example 3 | Production Example 3 | 248.5 | 664.1 | 0.68 | 0.635 | 1.09 | 0.15 | 13.4 | 0.032 | 2.4 | 4.5 | 6.9 |
| Example 4 | Production Example 4 | 215.7 | 567.8 | 0.71 | 0.615 | 0.99 | 0.16 | 12.2 | 0.041 | 2.4 | 4.2 | 6.8 |
| Example 5 | Production Example 5 | 148.8 | 395.3 | 0.92 | 0.635 | 0.98 | 0.14 | 14.3 | 0.035 | 2.9 | 3.1 | 5.2 |
| Example 6 | Production Example 3 | 247.8 | 652.3 | 0.68 | 0.628 | 1.10 | 0.50 | 44.7 | 0.033 | 2.9 | 3.9 | 5.8 |
| Comparative Example 1 | Comparative Production Example 1 | 144.5 | 400.2 | 1.08 | 0.675 | 2.24 | 0.16 | 14.4 | 0.062 | 3.5 | 0.0 | 0.0 |

In all of Examples 1 to 6 and Comparative Example 1, the non-magnetic coating composition and magnetic coating composition used were the composition of Formula (1) described above, respectively.

<Production of Flexible Disks: Examples 7 and 8 and Comparative Example 2>

The non-magnetic coating composition (2) for a non-magnetic layer was coated on a 68 μm-thick polyethylene terephthalate support so as to have a dry thickness of 1.5 μm. Immediately thereafter, the magnetic coating composition (2) for a magnetic layer was coated on the non-magnetic coating composition which was still in a wet state by the use of a simultaneous wet multiple-layer coating technique. Therein, coverage of the magnetic coating composition was controlled so as to form a magnetic layer of the desired thickness. Both layers thus coated were passed between same polarity-opposed rare earth magnets having a center magnetic field strength of 398 kA/m while they were still in a wet state, thereby achieving orientation in the length direction (i.e., the machine direction). Thereafter, the thus obtained material was passed successively through two Further, the magnetic material thus formed was subjected to treatment using a 7-stage calender at a temperature of 90° C. under a linear pressure of 300 kg/cm.

Each of the thus surface-treated magnetic materials was stamped into disks measuring 3.7 inches in diameter, and then underwent thermal treatment (70° C. for 24 hours) to promote curing of the coating layers and further burnish treatment with polishing tape to cut away projections on the surfaces. Thereafter, each of these disks was encased in a 3.7-inch cartridge in which a liner was previously installed (Zip-disk cartridge, produced by U.S. IOMEGA Inc.) and further to the cartridge were attached the desired mechanical parts. Thus, 3.7-inch floppy disks were produced.

The floppy disk samples were each examined for coercive force Hc, anisotropic magnetic field Hk, rotational hysteresis loss integral RH, squareness ratio SQ, thermal fluctuation magnetic field (Hf), magnetic layer thickness δ, residual magnetic flux density×magnetic layer thickness (Br·δ), decay slope, surface roughness, output and error rate. The evaluation results of those factors are shown in Table 3.

TABLE 3

| | Magnetic powder used | Hc (kA/m) | Hk (kA/m) | RH | SQ | Hf (A/m) | σ (μm) | Br·δ (mT·μm) | Decay slope | Surface roughness (nm) | Output (dB) | Error rate (10⁻⁶) |
|---|---|---|---|---|---|---|---|---|---|---|---|---|
| Example 7 | Production Example 1 | 169.5 | 474.9 | 0.93 | 0.53 | 1.16 | 0.30 | 23.8 | 0.033 | 2.7 | 0.9 | 0.001 |
| Example 8 | Production Example 2 | 191.3 | 552.8 | 0.85 | 0.53 | 1.14 | 0.30 | 24.1 | 0.036 | 2.8 | 1.1 | 0.001 |
| Comparative Example 1 | Comparative Production Example 1 | 134.7 | 415.5 | 1.17 | 0.52 | 2.27 | 0.30 | 25.6 | 0.064 | 3.3 | 1.1 | 0.01 |

In Examples 7 and 8 and Comparative Example 1, the non-magnetic coating composition and magnetic coating composition used were the composition of Formula (1) described above, respectively.

<Evaluation Methods>

Coercive Force Hc

The coercive force Hc of each sample was measured in a direction parallel to the direction of orientation in an externally applied magnetic field of 796 kA/m by means of a vibrating sample type of magnetometer (made by Toei Kogyo K.K.).

The magnetic torque measurement was performed with a magnetic torque meter TRT-2-15-AUT (made by Toei Kogyo K.K.), varying in magnetic field from a low strength to 800 kA/m. By these measurements, Hk and RH were determined. More specifically, values of rotational hysteresis loss Wr were measured in an externally applied magnetic field while increasing the magnetic field from a low magnetic field strength of the order of 0 to 20 kA/m to a high magnetic field strength of 800 kA/m, and the Wr values measured were plotted against the reciprocal of the applied magnetic field 1/H. The Wr curve data on the high magnetic field side was approximated by a quadratic curve, and the magnetic field corresponding to Wr=0 is sought. The thus obtained magnetic field is taken as the anisotropic magnetic field Hk. Further, the rotational hysteresis loss integral was determined by integrating Wr/Is (wherein Is represents magnetization of a sample, and Wr is divided by Is for standardization) with respect to 1/H.

Thermal Fluctuation Magnetic Field (Hf)

The irreversible magnetic susceptibility $\chi_{irre}$ (for which the numeric value of magnetic field strength corresponding to Hc was used) was determined from a remanence curve obtained. The thermal fluctuation magnetic field (Hf) was calculated from $Hf=S/\chi_{irre}$.

Magnetic Layer Thickness δ

From a magnetic recording medium sample, sections having a thickness of about 0.1 μm were cut across the length direction by means of a diamond cutter. Each section was observed under a transmission electron microscope at a magnification of 50,000 times, and photographs thereof were taken. The print size of these photographs were A-4 (210×297 mm) or A-5 (148×210 mm) size, and the overall magnification was adjusted to 200,000 times in print size. On the photo print, the interface between the magnetic layer and the lower layer, which was visually judged from a shape difference between the ferromagnetic powder and the nonmagnetic powder, and the magnetic layer surface were each bordered with a black line. And the spacing between these black lines was measured with an image processing device IBAS2 made by Zeiss A. G. When the sample photograph had a length of 21 cm, the measuring process was repeated 85 to 300 times. The mean value of the data obtained therein was taken as the magnetic layer thickness δ.

Decay Slope

The slope (S) of magnetization decay was determined by performing DC saturation magnetization, applying a magnetic field identical in magnitude with the magnetic filed applied in the measurement of coercive force Hc but opposite in direction thereto, measuring decay of magnetization over a period of 1,000 seconds, and finding a slope (S) of magnetization decay between 10–1,000 seconds inclusive with respect to ln t (t is a time expressed in second). The slope (S) was standardized by the residual magnetization Mr, and the standardized value was defined as the decay slope of magnetization.

Surface Roughness

The surface of each sample was surveyed over an area of 250 μm square by the use of a light-interference three-dimensional roughness tester TOPO-3D (made by WYKO Co. in US Arizona State). In evaluation of measurement values, corrections including slope correction, spherical correction and cylindrical correction were made in accordance with JIS-B601, and the center-plane average surface roughness Ra was adopted as the surface roughness.

Output of Disk Media

Output was measured at a line recording density of 144 kbpi and at a track density of 144 Tpi. As the output reference, commercial zip-100 was employed. The line recording density is a bit number of signals recorded per inch in the recording direction. And the track density is a number of tracks per inch. The product of line packing density and track density is the area recording density.

Error Rate of Disk Media

Signals of the line packing density determined by the measurement of output were recorded on a sample disk in accordance with (2,7) RLL modulation system, and errors were measured.

Output and C/N Ratio of Tape Media

An 8-mm deck for data recording was equipped with an MIG head (having a head gap of 0.2 μm, a track width of 17 μm, a saturation flux density of 1.5 T and an azimuth angle of 20 degrees) and an MR head for reproducing (having SAL bias, an MR element made from Fe—Ni, a track width of 6 μm, a gap length of 0.2 μm and an azimuth angle of 20 degrees). By the use of the MIG head, the relative velocity between a tape and the head was set at 10.2 m/sec, an optimum recording current was determined from the input-output characteristic of ½ Tb (λ=0.5 μm), and signals were recorded with this current. The thus recorded signals were reproduced with the MR head. The thus-obtained value was regarded as an Output. C/N was defined so as to cover from the reproducing carrier peak to demagnetization noise, and the resolution band width of an spectral analyzer was adjusted to 100 kHz. The C/N ratio shown in Table 2 are relative values, with the tape prepared in Comparative Example 1 being taken as 0.

As is apparent from the results of Tables 2 and 3, the magnetic recording media according to the present invention had high C/N ratios and reduced magnetization loss, compared with the comparative magnetic recording media. This indicates that the present magnetic recording media enable high-density recording and cause reduced signal decays upon long-term storage.

EFFECT OF THE INVENTION

By incorporating in a magnetic layer a Hexagonal (system) ferrite magnetic powder having an average tabular diameter of 10 to 35 nm and a coercive force Hc of 135 to 400 kA/m and controlling the coercive force of the magnetic layer to the range of 135 to 440 kA/m, the anisotropic magnetic field to at least 358 kA/m and the rotational hysteresis loss integral to the 0.5–0.95 range, the magnetic recording medium of the present invention can have a high short-wavelength output and a high C/N ratio even when the playback is carried out by combination with an MR head, and magnetization recorded therein is highly stable.

The entitle disclosure of each and every foreign patent application from which the benefit of foreign priority has been claimed in the present application is incorporated herein by reference, as if fully set forth herein.

While the present invention has been described in detail and with reference to specific embodiments thereof, it will be apparent to one skilled in the art that various changes and modifications can be made therein without departing from the spirit and scope thereof.

What is claimed is:

1. A magnetic recording medium having on a support a non-magnetic layer comprising a non-magnetic powder dispersed in a binder resin and on the non-magnetic layer a magnetic layer comprising a ferromagnetic powder dispersed in a binder resin, wherein said ferromagnetic powder is a hexagonal (system) ferrite magnetic powder having an average tabular diameter of 10 to 35 nm and a coercive force (Hc) of 135 to 400 kA/m, and said magnetic layer has a coercive force (Hc) of 135 to 440 kA/m, an anisotropic magnetic field of at least 358 kA/m and a rotational hysteresis loss integral of 0.5 to 0.95.

2. The magnetic recording medium as in claim 1, wherein the magnetic layer has a squareness ratio (SQ) of 0.50 to 0.64.

3. The magnetic recording medium as in claim 1, wherein the coercive force/anisotropic magnetic field (Hc/Hk) ratio is 0.3 to 0.6.

* * * * *